Figure 1:
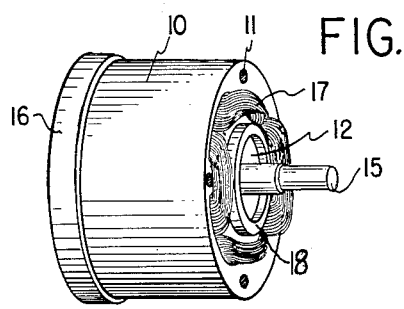

April 1, 1952  E. W. BALLENTINE  2,591,117
SHADED POLE MOTOR
Filed Dec. 29, 1949

INVENTOR.
Earle W. Ballentine
BY
Foorman L. Mueller
Atty.

Patented Apr. 1, 1952

2,591,117

UNITED STATES PATENT OFFICE 2,591,117

SHADED POLE MOTOR

Earle W. Ballentine, Laguna Beach, Calif., assignor, by mesne assignments, to Redmond Company, Inc., Owosso, Mich., a corporation of Michigan Application December 29, 1949, Serial No. 135,731

5 Claims. (Cl. 172—278)

This invention relates generally to motors of the shaded pole type and more particularly to larger shaded pole motors having four, six or more poles.

Shaded pole motors have been used extensively in applications in which relatively small power is required. As is well known, shading coils are used with the poles of such motors to provide a flux which lags the main flux to thereby tend to produce a rotating field so that the motor will have starting torque. The principal objection to such motors is that the starting torque and efficiency are both objectionably low. In general, changes in the structure which tend to increase the starting torque inherently reduce the running efficiency and conversely changes which increase the running efficiency result in a decrease in starting torque.

In my Patent No. 2,482,207, there is described and claimed a two pole motor of the shaded pole type having poles of such configuration that both the starting torque and running efficiency is increased over that of prior constructions. However, the problems involved in motors having four or more poles are entirely different than those encountered in two pole motors and it is therefore not possible to carry over the teachings found desirable in two pole motors. Actually certain features which provide improved operation in two pole motors are found to render a motor having four or more poles less effective.

It is, therefore, an object of the present invention to provide an improved motor of the shaded pole type having four or more poles.

A further object of this invention is to provide a shaded pole motor having four or more poles in which each pole is constructed to provide an effective flux distribution thereacross so that the torque and efficiency of the motor are increased.

Another object of this invention is to provide a shaded pole motor having four or more poles in which leading and lagging fluxes are produced at the opposite ends of each pole face to provide a more effective field.

A feature of this invention is the provision of a shaded pole motor having at least four poles in which each pole has a shaded section at one end which is smaller than usual in motors of this type, and an increased air-gap at the other end thereof.

A further feature is the provision of a shaded pole motor having four more poles each having a shaded section and a high reluctance section, with adjacent poles being spaced to provide a reluctance therebetween several times that of the high reluctance section of the pole.

A still further feature of this invention is the provision of a shaded pole motor having four or more poles with the pole face-pole arc ratio of the poles being at least 85 percent and with each pole having an increased air-gap extending over approximately 25 percent of the area of each pole at one end and a shaded section extending over approximately 20 percent of the area of the pole at the other end. The shaded section is increased as the number of poles is increased from four.

Figure 2:
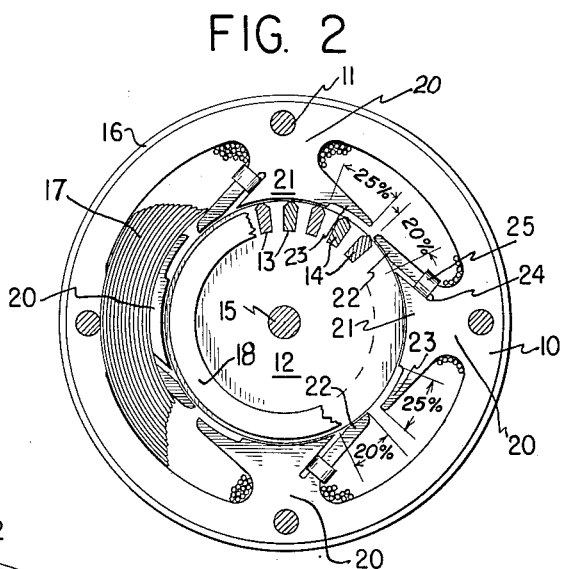
Figure 3:
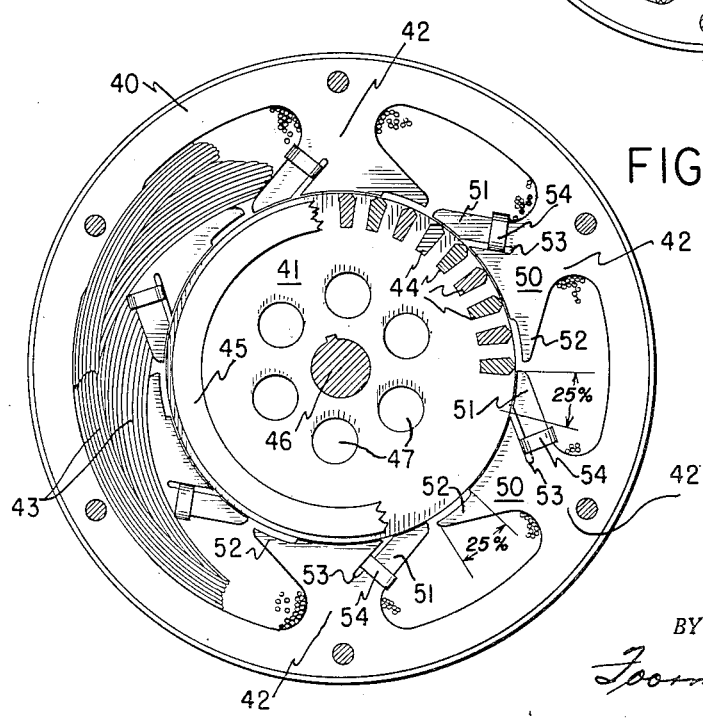

Further objects and features will be apparent from a consideration of the following description when taken in connection with the accompanying drawings in which:

Fig. 1 is a perspective view showing a four pole motor according to the invention, Fig. 2 is an end view partly in cross section illustrating the configuration of the poles of the motor of Fig. 1, and Fig. 3 is an end view partly in cross section of a six pole motor in accordance with the invention.

In practicing the invention there is provided a shaded pole motor including a laminated stator having four or more integral poles. The invention is particularly applicable to motors having four and six poles and is also applicable to motors having a larger number of poles. An eddy current rotor is mounted for rotation in the stator and includes a plurality of rotor bars and conducting rings for connecting the same. Each pole includes a pole face forming an air-gap with the rotor and extending over a large percentage (at least 85 percent) of the pole arc. Each pole face includes a main center section and auxiliary sections on either side of the main section. The first auxiliary section has a shading ring thereon to provide a flux which lags the flux in the main section. The second auxiliary section is shaped so that the air-gap between this section and the rotor is greater than that between the main section and the rotor so that the flux in the second auxiliary section leads the flux through the first auxiliary section. The shaded section is substantially smaller than that portion normally shaded in a motor of the same general type. The extent of the second section is of the order of 25 percent of the entire pole face area. Although the face of each pole covers a large part of the pole arc, the spacing between adjacent pole tips is such that the reluctance therebetween is considerably greater than the reluctance between the second auxiliary section and the rotor.

Referring now to the drawings, in Figs. 1 and 2 there is illustrated a shaded pole motor having four poles. The motor includes a stator 10 which is made up of a plurality of laminations secured together as by rivets 11. Mounted within the stator is a rotor 12 which likewise is formed of a plurality of laminations having punched out openings 13 in which conducting bars 14 are placed. The conducting bars are connected at each end by conducting rings 18 so that a plurality of closed conducting loops are provided around the surface of the rotor 12. The rotor is mounted on a shaft 15 which is supported in bearings (not shown) for rotation with respect to the stator. The bearings may be provided in plates 16.

The stator laminations are punched to include integral portions which form four poles 20 having windings 17 thereon for producing flux therein. The face of each of the poles includes a main center section 21, a first auxiliary section 22 and a second auxiliary section 23. The air-gap between the main section 21 of each pole and the rotor 12 and that between the auxiliary section 22 and the rotor are substantially the same. The first auxiliary section 22 is separated from the main section 21 by a slot 24 which receives a shading ring or coil 25 for modifying the flux in the section 22 of the pole face. The shading ring is formed of a closed turn of high conducting material. The use of such shading rings to produce a flux which lags the main flux is well known and will therefore not be described. The second auxiliary section 23 of each pole is of such configuration that the air-gap between this section and the rotor 12 is greater than the air-gap between the other sections of the pole and the rotor. This increased air-gap provides an increased reluctance for the flux which passes through the auxiliary section 23. The flux through the auxiliary section 23, therefore, due to the increased reluctance, leads the flux in the main pole section 21. The leading flux produced through the section 23 can be controlled by adjusting the width of the air-gap on the section 23 with respect to the air-gaps of sections 21 and 22, and also by adjusting the extent of the section 23. In operation, the rotor will turn in a counter-clockwise direction so that the rotor bars pass the sections 23, 21 and 22 in that order.

As previously stated, the faces of each pole extend over a substantial part of the pole arc so that the space allotted to each pole is effectively utilized. The pole face-pole arc ratio should be at least 85 percent. However, the pole faces are of such configuration that the gap between the shaded section 22 of one pole and the high reluctance section 23 of the adjacent pole provides an effective reluctance which is much larger than the reluctance between the section 23 and the rotor. This high reluctance path decreases the flux which passes between adjacent pole tips so that substantially all the flux from the auxiliary sections goes to the rotor and the auxiliary sections are thereby rendered highly effective.

To provide the most satisfactory operation of the four pole motor, the section 22 should carry approximately 20 percent of the total flux of each pole. This is considerably less than the portion normally shaded as it is considered standard practice to shade about 25 percent of the flux of each pole in a four pole motor. The reluctance gap 23 has an extent of approximately 25 percent of each pole face. In a motor having a diameter of approximately 3½ inches (shown to scale in Fig. 2), the air-gap between the rotor and the main section of each pole is about $1/64$ of an inch and the air-gap of the reluctance section 23 is about $3/64$ of an inch. The spacing between adjacent pole tips is of the order of $3/32$ of an inch. This provides a reluctance between adjacent pole tips which is about eight times the reluctance between the section 23 and the rotor. These various dimensions are dependent upon the size of the motor and the particular characteristics desired. However, the section of each pole which is shaded and the section having a high reluctance gap may be held relatively close to the percents stated to provide the best operation.

In Fig. 3 there is illustrated a six pole motor constructed in accordance with the invention. The motor includes a laminated stator 40 and a laminated rotor 41. The stator includes six integral poles 42 having windings 43 for energizing the same. The rotor includes a plurality of conducting rotor bars 44 and conducting rings 45 for interconnecting the rotor bars. The rotor 41 is supported on a shaft 46 which may be mounted for rotation in bearings secured to the stator by a suitable framework. Openings 47 are provided in the rotor so that air may be circulated therethrough for cooling the rotor.

Considering now the stator poles 43, these poles include faces having main center sections 50, shaded sections 51 and sections 52 having a high reluctance gap with the rotor. The shaded sections 51 are separated from the main sections 50 by slots 53 which receive the shading coils or rings 54. The sections 50 and 51 form equal air-gaps of small width with the rotor 41. As previously stated, the shading ring 54 will cause the flux in the pole section 51 to lag the flux in the main section 50. The gaps between the pole section 52 and the rotor provide high reluctance to the flux therein so that this flux will lead the flux in the main section 50 in the same manner as described in connection with the four pole structure of Fig. 2. The rotor 41 will rotate in a counter-clockwise direction so that the conducting loops therein will pass first the leading flux, then the main flux and last the lagging flux.

For providing a rotor having improved operation characteristics, the shaded section of the pole carries a smaller amount of flux than in motors generally being used. The section 51 carries about 25 percent of the total flux of each pole as compared to standard six pole motors in which the shaded section carries about 34 percent of the total flux. The reluctance gap 52 extends over about 25 percent of the pole face. In a six pole motor having a diameter of about five inches (shown to scale in Fig. 3), the gap between the section 52 and the motor 41 is of the order of $3/64$ of an inch as compared to the gap between the main section 50 of the pole and the rotor of about $1/64$ of an inch. The spacing between the pole tips, that is between the shaded section 51 of one pole and the high reluctance portion 52 of the adjacent pole, is such that the reluctance between pole tips is much greater than that between the pole section 52 and the rotor. In a motor of the size described the spacing between pole tips is of the order of $3/32$ of an inch to provide a reluctance of approximately eight times the reluctance between the section 52 and the rotor. This spacing permits the pole face to utilize substantially all of the pole arc (at least 85 percent) and yet provides sufficient reluctance between adjacent pole tips that the amount of flux passing directly therebetween is not substantial and the shaded sections and the high reluctance sections have maximum effect upon the rotor.

As stated above, the use of integral poles having a shaded section for providing a lagging flux and a high reluctance section for providing a leading flux result in highly improved motor operation. In such a structure the shaded section may have an extent substantially smaller than that usually used heretofore, the reduction being of the order of twenty percent. The portion of the pole included in the shaded section depends upon the number of poles, being greater as the number of poles increases. This portion has substantially a constant arcuate extent for stators having various number of poles, extending over approximately eighteen degrees for a four pole motor and over fifteen degrees for a six pole motor. These values are to be compared with a minimum arcuate extent of more than twenty degrees in standard four and six pole motors. The high reluctance section although not unduly critical has been found to provide improved operation when it has an extent of the order of 25 percent of the entire pole face area. It is desirable that the shaded pole section and the high reluctance pole section each have an extent as great as the rotor bar spacing so that the flux therefrom will completely fill one conducting loop formed by the rotor bar. As previously stated, the spacing between adjacent pole tips should be small so that substantially the entire pole arc is utilized, and at the same time should be great enough so that the reluctance is several times greater than that of the gap between the high reluctance section and the rotor.

Motors constructed in accordance with the invention have improved flux distribution over the pole faces so that the efficiency, power output, and starting torque are all improved. Tests have shown improvement in efficiency of 35 percent as compared with standard motors of the same type and size. The construction shown provides the required starting torque without decreasing the running efficiency so that motors so constructed can be used for a wide variety of applications.

While certain embodiments of the invention have been described which are illustrative thereof, it is obvious that various changes and modifications can be made therein without departing from the intended scope of the invention as defined in the appended claims.

I claim:

1. In an induction motor of the shaded pole type, a squirrel cage rotor, a stator surrounding said rotor and concentric therewith, said stator being symmetrical and being divided into at least four oppositely positioned salient poles which form radial air-gaps with said rotor, with each pole being separated from its adjacent poles by circumferential air-gaps of at least 5% and not more than 15% of the arcuate facial length of any one of said poles, each of said poles having a portion of its face recessed to provide an additional air-gap supplementing said radial air-gaps, the accumulative arcuate extent of said recessed portions of the pole faces being at least 20% of the entire circle with which said pole faces coincide, the reluctance of said circumferential air-gaps being substantially greater than that of said additional air-gaps.

2. In an induction motor of the shaded pole type, a squirrel cage rotor, a stator surrounding said rotor and concentric therewith, said stator being symmetrical and being divided into at least two pairs of oppositely positioned salient poles having arcuate faces which form uniform radial air-gaps with said rotor, with each pole being separated from its adjacent poles by circumferential air-gaps of at least 5% and not more than 15% of the arcuate facial length of any one of said poles, each of said poles having a portion of its face recessed to provide an additional air-gap supplementing said radial air-gaps, said additional air-gaps having a length of the order of three times the length of said radial air-gaps, the accumulative arcuate extent of said recessed portions of the pole faces being at least 20% of the entire circle with which the faces of said poles coincide, the reluctance of said circumferential air-gaps being substantially greater than that of said additional air-gaps.

3. In an induction motor of the shaded pole type, a squirrel cage rotor, a stator surrounding said rotor and concentric therewith, said stator being divided into at least four salient poles having faces forming radial air-gaps with said rotor, a shading ring associated with each pole providing a shaded section at one edge of the face thereof having a lagging flux therein, said shaded section having an extent of not more than 25% of the total area of each pole face, each of said poles having a portion of its face recessed to provide an additional air-gap supplementing said first-named air-gaps at the opposite edge of the face thereof having a leading flux therein, said recessed portion having an extent of at least 20% of the total area of each pole face, said shaded section of each pole being separated from said recessed portion of the adjacent pole by a circumferential air-gap of at least 5% and not more than 15% of the arcuate facial length of any one of said poles, the reluctance of said circumferential air-gaps being substantially greater than that of said additional air-gaps.

4. In an induction motor of the shaded pole type, a squirrel cage rotor, a stator surrounding said rotor and concentric therewith, said stator being divided into at least two pairs of salient poles having faces forming radial air-gaps with said rotor, a shading ring associated with each pole providing a shaded section at one edge of the face thereof having a lagging flux therein, each of said poles having a portion of its face recessed to provide an additional air-gap supplementing said first-named air-gaps, said recessed portion of each pole being at the edge of the face thereof opposite said shaded section and having a leading flux therein, said shaded section of each pole being separated from said recessed portion of the adjacent pole by a circumferential air-gap of at least 5% and not more than 15% of the arcuate facial length of any one of said poles, the reluctance of said circumferential air-gaps being substantially greater than that of said additional air-gaps.

5. In an induction motor of the shaded pole type, a squirrel cage rotor, a laminated stator surounding said rotor and concentric therewith, said stator being symmetrical and being divided into three pairs of oppositely positioned salient poles forming uniform radial air-gaps with said rotor, with each pole being separated from its adjacent poles by circumferential air-gaps of at least 5% and not more than 15% of the arcuate facial length of any one of said poles, and a shading ring associated with each pole providing a shaded section at one edge of the face thereof, each of said poles having a portion of its face recessed at the edge thereof opposite said shaded edge to provide an additional air-gap supplementing said radial air-gaps, the reluctance of said circumferential air-gaps being substantially greater than that of said additional air gaps.

EARLE W. BALLENTINE.

REFERENCES CITED

The following references are of record in the file of this patent:

UNITED STATES PATENTS

| Number | Name | Date |
|---|---|---|
| 2,261,890 | Schneider | Nov. 4, 1941 |
| 2,278,139 | Puchy | Mar. 31, 1942 |
| 2,481,113 | Hardie | Sept. 6, 1949 |